CALCULATING DEVICE
Filed Aug. 3, 1960 9 Sheets-Sheet 1
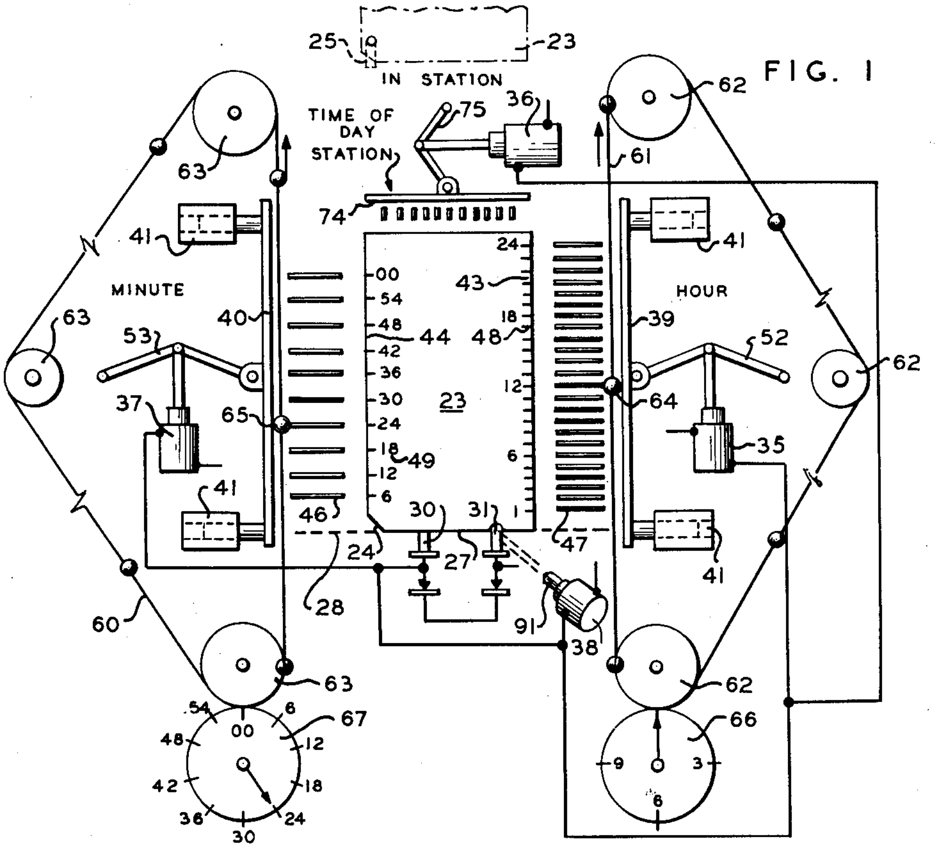
FIG. 1
FIG. 2
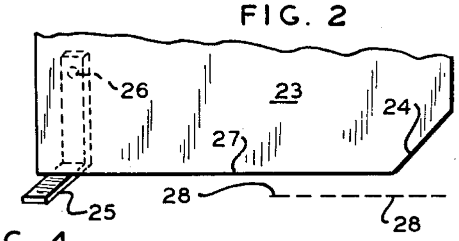
FIG. 3
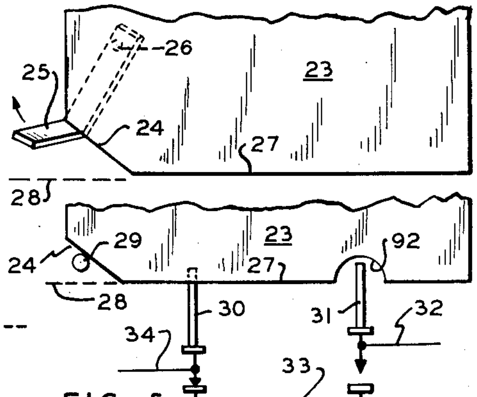
FIG. 4
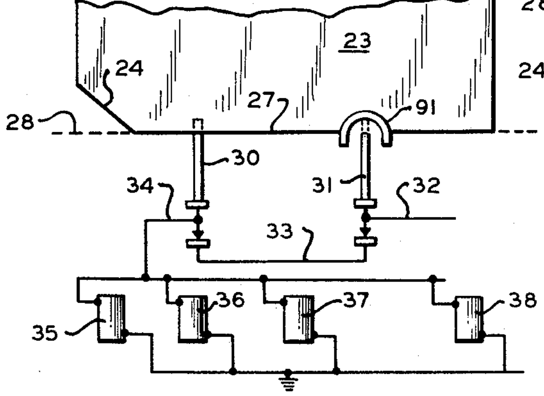
FIG. 5
INVENTORS
W. C. MOODIE, SR.
J. H. LEPPERHOFF
BY [signature]
ATTORNEY April 17, 1962 W. C. MOODIE, SR., ETAL 3,030,013

CALCULATING DEVICE

Filed Aug. 3, 1960 9 Sheets-Sheet 2

*INVENTORS*
W. C. MOODIE, SR.
J. H. LEPPERHOFF

BY [signature]

ATTORNEY

*INVENTORS*
W. C. MOODIE, SR.
J. H. LEPPERHOFF
*BY*
[signature]
ATTORNEY

CALCULATING DEVICE

Filed Aug. 3, 1960 9 Sheets-Sheet 4

INVENTORS
W. C. MOODIE, SR.
J. H. LEPPERHOFF
BY
ATTORNEY

CALCULATING DEVICE

Filed Aug. 3, 1960 9 Sheets-Sheet 5

INVENTORS
W. C. MOODIE, SR.
J. H. LEPPERHOFF

BY Harry Kummer

ATTORNEY

CALCULATING DEVICE

INVENTORS
W. C. MOODIE, SR.
J. H. LEPPERHOFF
BY
ATTORNEY

SUBTRACT CORRECTION IN PRINTING ELAPSED TIME

INVENTORS
W. C. MOODIE, SR.
J. H. LEPPERHOFF
BY [signature]
ATTORNEY

CALCULATING DEVICE

Filed Aug. 3, 1960 9 Sheets-Sheet 8

INVENTORS
W. C. MOODIE, SR
J. H. LEPPERHOFF
BY
Harry Brunner
ATTORNEY

CALCULATING DEVICE

Filed Aug. 3, 1960 9 Sheets-Sheet 9

*INVENTORS*
W. C. MOODIE, SR.
J. H. LEPPERHOFF
*BY*
ATTORNEY

United States Patent Office 3,030,013

Patented Apr. 17, 1962

3,030,013

CALCULATING DEVICE

William C. Moodie, Sr., and John H. Lepperhoff, Montclair, N.J., assignors to Calculagraph Co., Harrison, N.J., a corporation of New Jersey Filed Aug. 3, 1960, Ser. No. 47,216

6 Claims. (Cl. 235—61.8)

Figures 6, 7, 8:
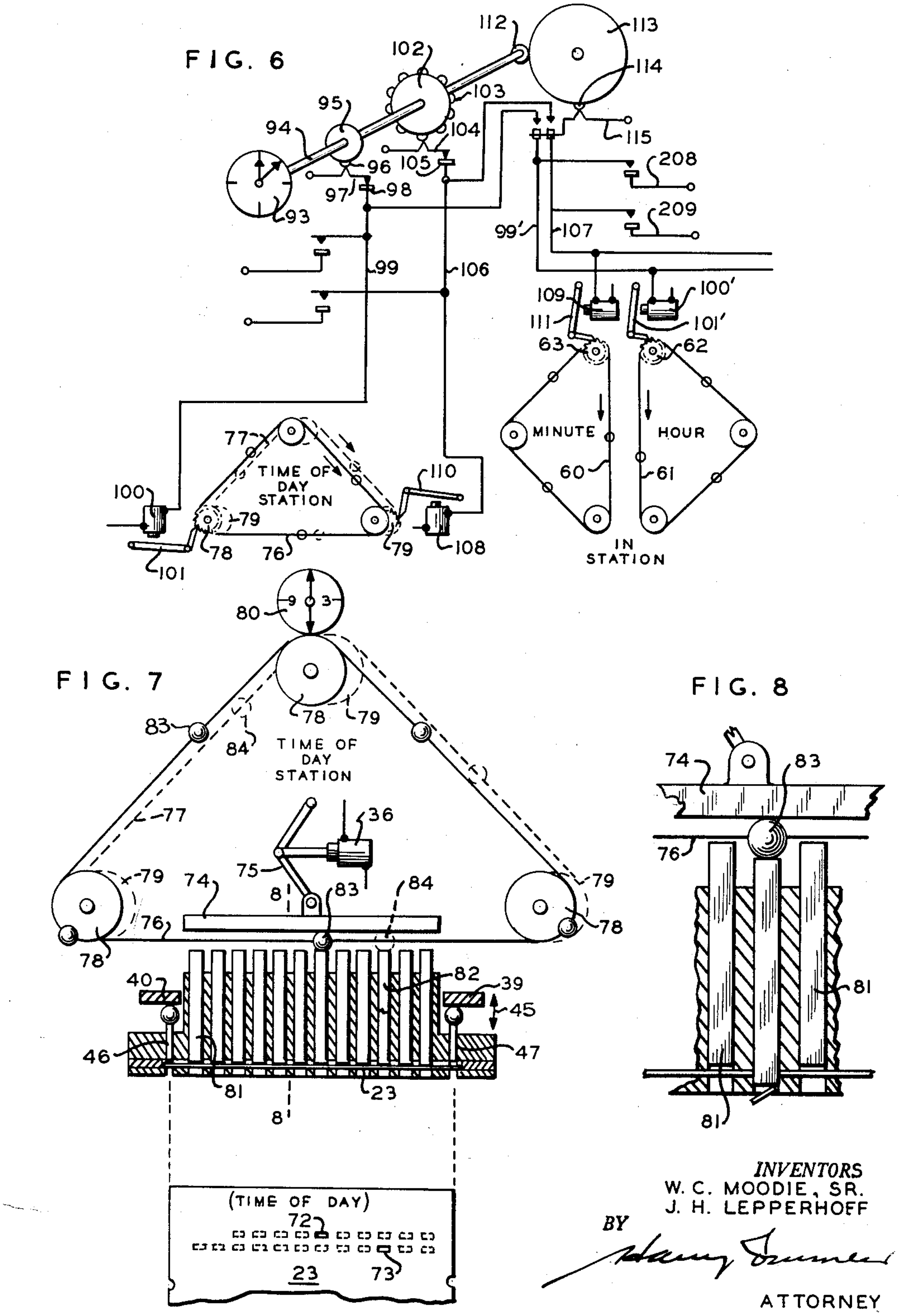

This invention relates to a calculating device designed for initial insertion of a card in predetermined proper position at a given station—for example, through a slot in said device, automatic means being triggered on such insertion of the card to mark the time of insertion of the card therein, another station receiving the card and sensing the marked time of insertion and thus the elapsed time and marking the card with the so calculated elapsed time.

The device may incorporate further means for also marking the card with time of day of initial insertion of the card in the device. The card is preferably inaccessible at the elapsed time station of the device and may automatically move to a machine or station for further calculations.

Elapsed time, pursuant to this invention, is calculated by members movable along the side edges of the card based on the time markings on the card. Said means, moving along the edges of the card at the out station, automatically actuate electrical marking members of the value of the difference between the notches marked along the edges of the card at the "in" and time of insertion of the card at the "out" stations of the device. This objective is preferably attained by the provision of time scales at the "out" station, carrying switches for hours and fractions of an hour, movable against the side edges of the card to sense the notches marked on the card at the (prior) "in" station of the device.

The device is further provided with means at the "out" station interposed between the time scale for fractional parts of the hour and the elapsed time printing mechanism thereby actuated, such that, when the time in minutes pass the hour on positioning the card at said "out" station of the machine is less than that marked on the card at the "in" station, the hour marking means will be corrected to mark one less hour than indicated by the sensing mechanism, to thus calculate true elapsed time.

A further feature of the invention is the provision of a time delay at the "out" station to afford time for subtraction of one hour where appropriate as above mentioned.

The device may further include novel means for impressing a registration control mark on the card on insertion of the card at the "in" station which automatically cuts off the punching and time of day mechanisms which will have simultaneously completed their operations, and prevents reinsertion of the card at the "in" station or insertion thereof at the "out" station in wiring position.

In accordance with the invention, novel means are provided for punching elapsed time indicia on cards such that the cards may be subsequently automatically sensed for accounting or payroll procedures, for example.

The invention thus marks the card with a starting point indicating the beginning of the period to be measured, marks the card to prevent reinsertion and at the proper subsequent registration, at the "out" station computes and automatically marks the card with the elapsed time since the starting point.

Pursuant to the invention this is done without requiring intervention by the user other than to insert the card into the device at the initiation and completion of the cycle to be timed.

A further object is to provide such device with means for automatically deducting non-productive time, such as lunch, over-night, or other non-productive periods, from the time calculations.

A further object of the invention is to compute elapsed time through holes punched in a card marginally and sensed marginally.

The invention may be carried out by novel punch means and novel means for selecting and operating the required punches in accordance with clock time and elapsed time computations.

In prior art devices for computing and recording elapsed time using cards, for the further processing of such cards in accounting systems for cost and payroll accounting, it has been necessary to handle such visual data—a time consuming and expensive procedure giving rise to many errors. The present invention provides a procedure wherein the elapsed time is punched in the form of holes suitable to further automatic processing in business machines.

The device of the invention computes and records time accurately and efficiently and can be manufactured with few moving parts, at low cost, without sacrificing accuracy and durability, and may be maintained in proper working condition economically.

Pursuant to the invention, at the start of a job or operation, the operator inserts a time card in the device, which thereupon automatically records the time of the day as punched holes in the card to facilitate processing the card according to starting time in business machines if desired and simultaneously notches the two side edges of the card to indicate starting time in such a manner and at such locations as to facilitate subsequent sensing without interfering with mechanisms of processing business machines.

In most accounting systems in current use, the maximum period of time desired to be recorded is twelve hours and the minimum period is one-tenth of an hour—six minutes. Obviously, however, the invention is not limited to such time intervals and may be equally applied to systems wherein twenty four or longer hourly periods are encountered and wherein fractions other than tenths or decimals of the hour are to be recorded.

In the drawings, wherein similar reference characters indicate like parts:

FIG. 1 is a schematic view of the "in" station of a computer embodying the invention, showing a means for marking two side edges of the card with the time of positioning thereof at said station, FIG. 2 is a schematic elevational view showing the lower edge of a card improperly inserted at the "in" station, stopped by control means from moving to the registration point 28 and thus prevented from actuating the mechanism for marking the "in" time on the card.

Figure 10:
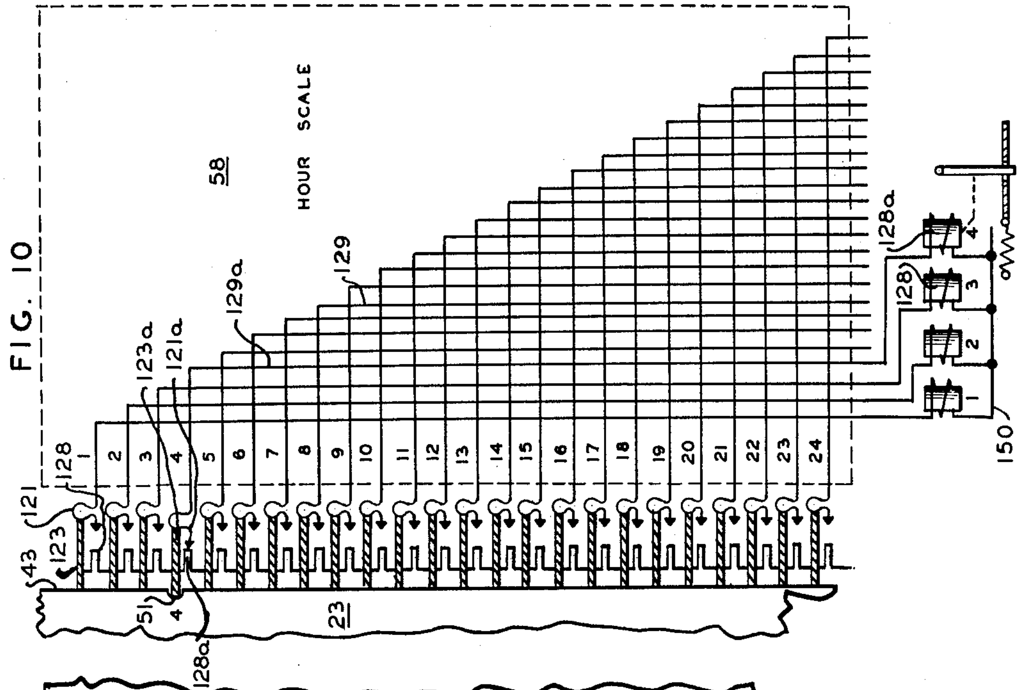
Figure 9:
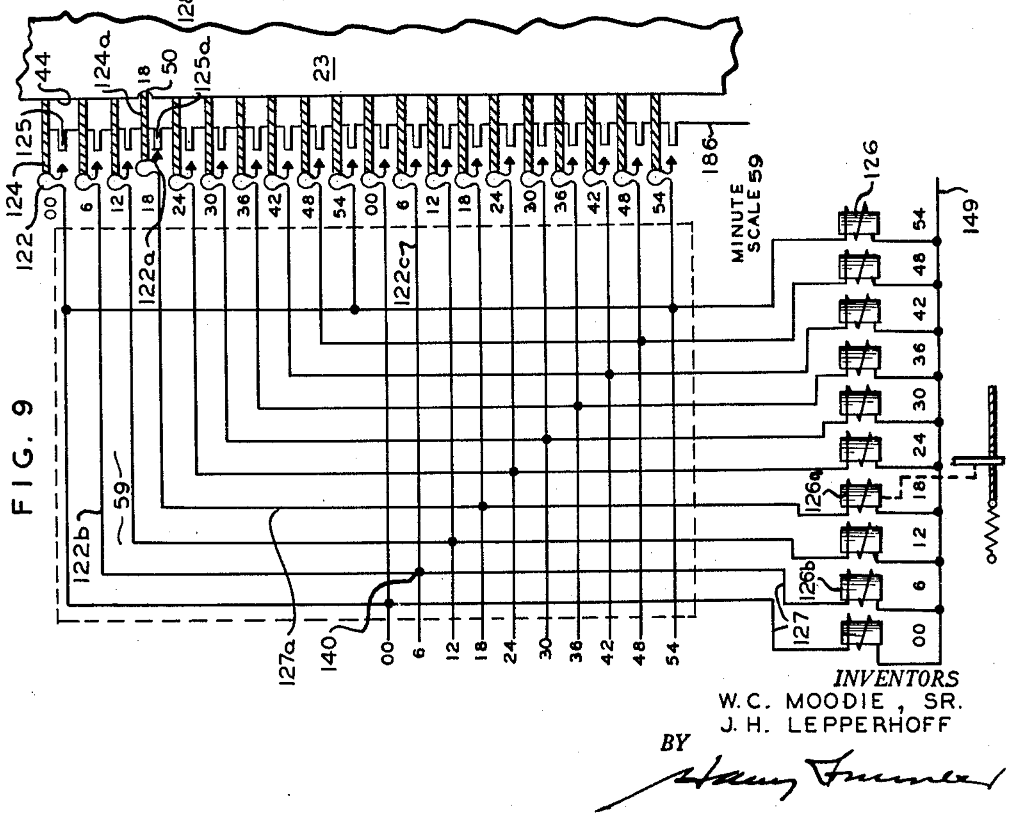
Figures 11, 12, 13, 14:
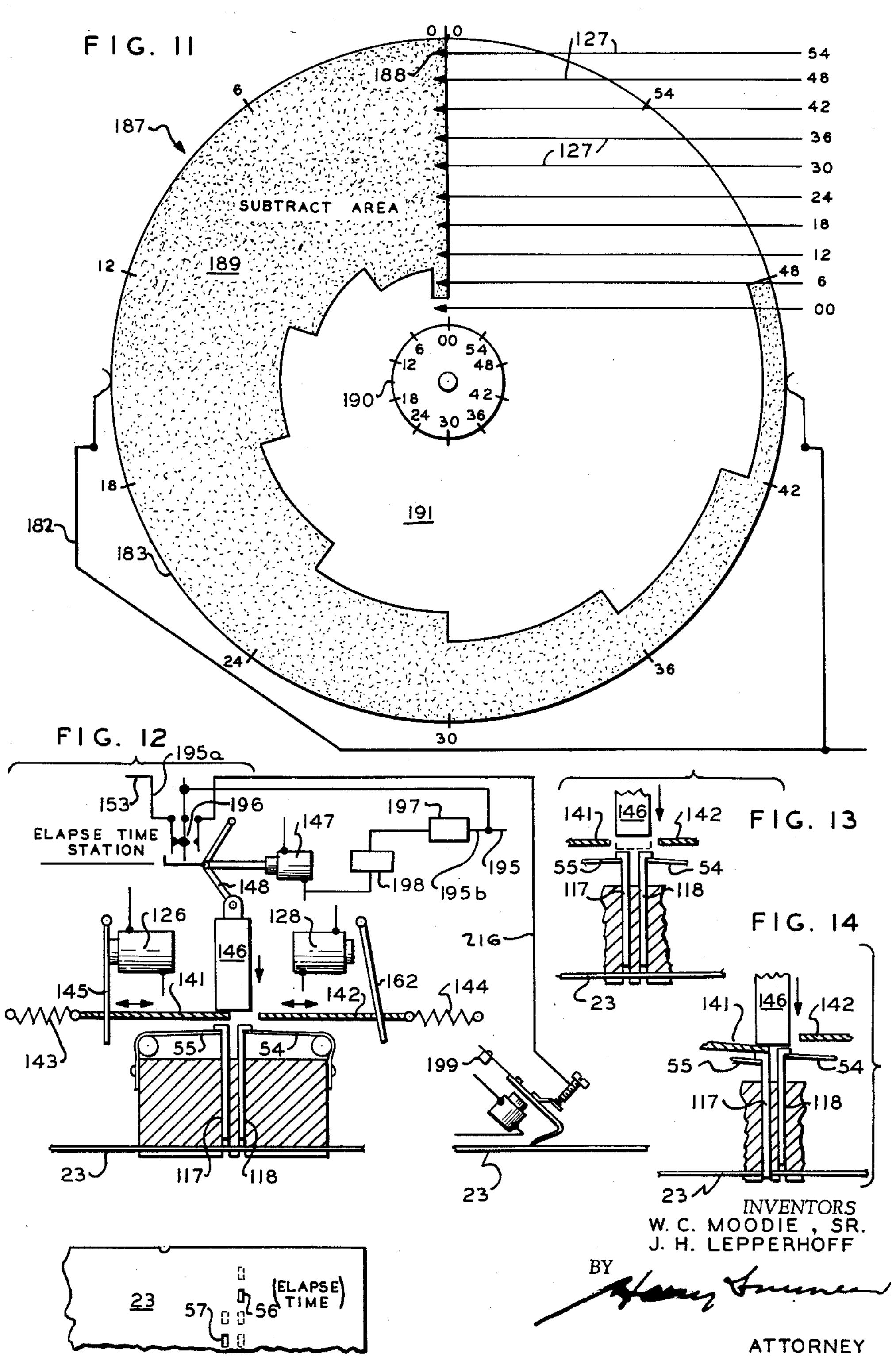

FIG. 3 is a similar view, showing the control means moved by the card when the latter is properly inserted at the "in" station, allowing the card to move to the registration point 28 for actuating the mechanism for marking the "in" time on the card, FIG. 4 is a similar view, showing the control punch 91 just actuated by the properly positioned card, FIG. 5 is a similar view, showing the control notch so impressed by said punch in the card, FIG. 6 is a partly perspective, partly schematic view, showing a wiring diagram for the circuit at the "in" station of the device, FIG. 7 is an elevational, partly sectional and schematic view, showing the actual time of day punching mechanism and the upper portion of the card which is marked therewith (72, 73), on positioning said card at the "in" station, FIG. 8 is a fragmentary, enlarged view thereof, taken at line 8—8 of FIG. 7, FIG. 9 is a wiring diagram of the computer minute scale 59, switches 122 and electromagnets 126 controlled thereby, the minute scale being shown positioned against a side edge of the card 23, FIG. 10 is a similar view of the hour scale, shown positioned against the other side edge of the card, FIG. 11 is a schematic plan view of a subtract switch plate 183 and associated parts, for correction of calculation of the number of elapsed hours, FIG. 12 is a partly sectional and fragmentary elevational view, showing the positioning of minute and hour elapsed time punches 117, 118 and high speed electromagnetically operated interposers 141, 142 to actuate said punches to register the elapsed time on the card as at 56, 57 and showing, schematically, parts associated therewith, including a card ejecting device 199 operative after the marking operations at the "out" station have been performed.

Figures 15, 16, 17:
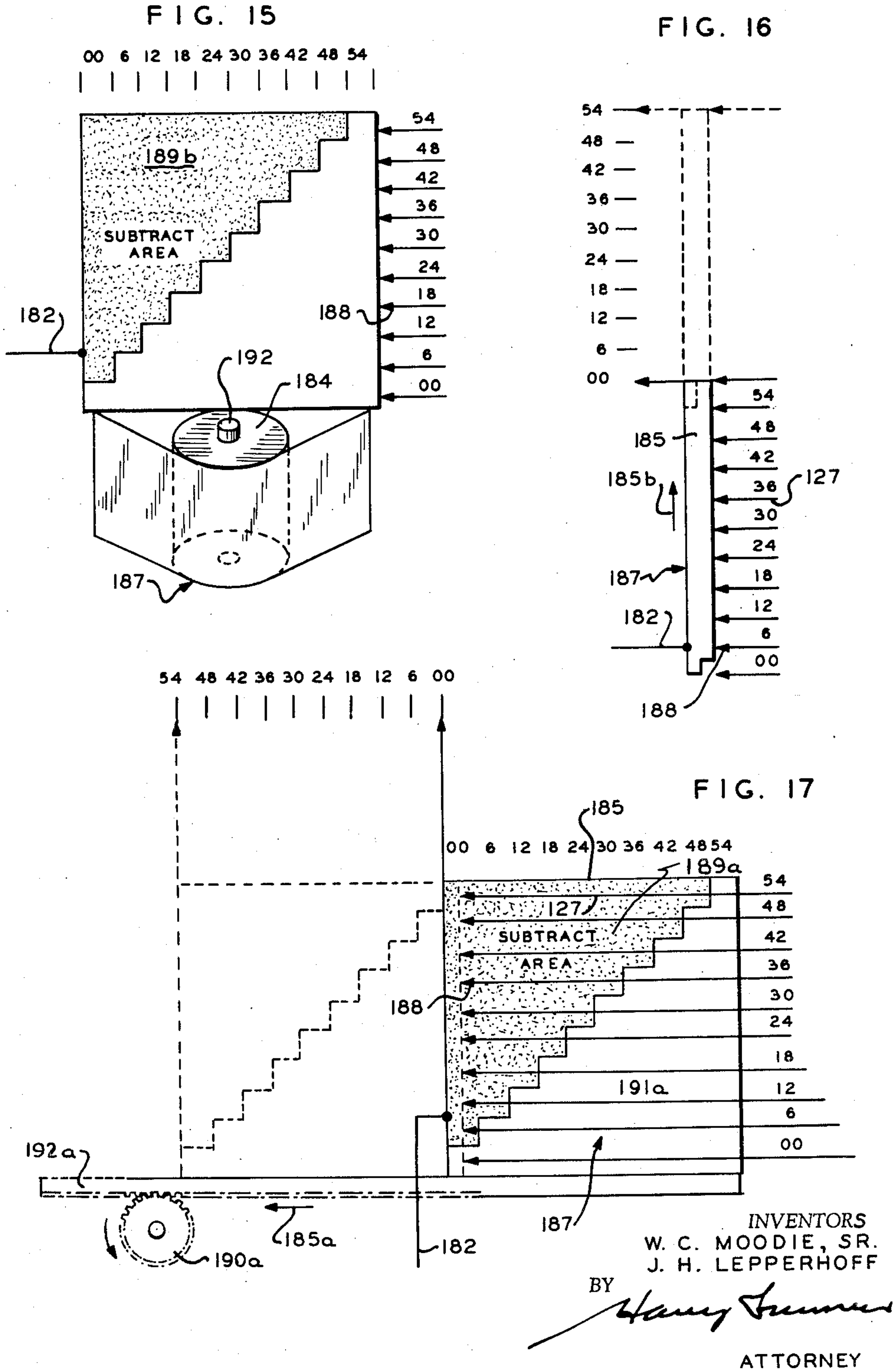
Figure 18:
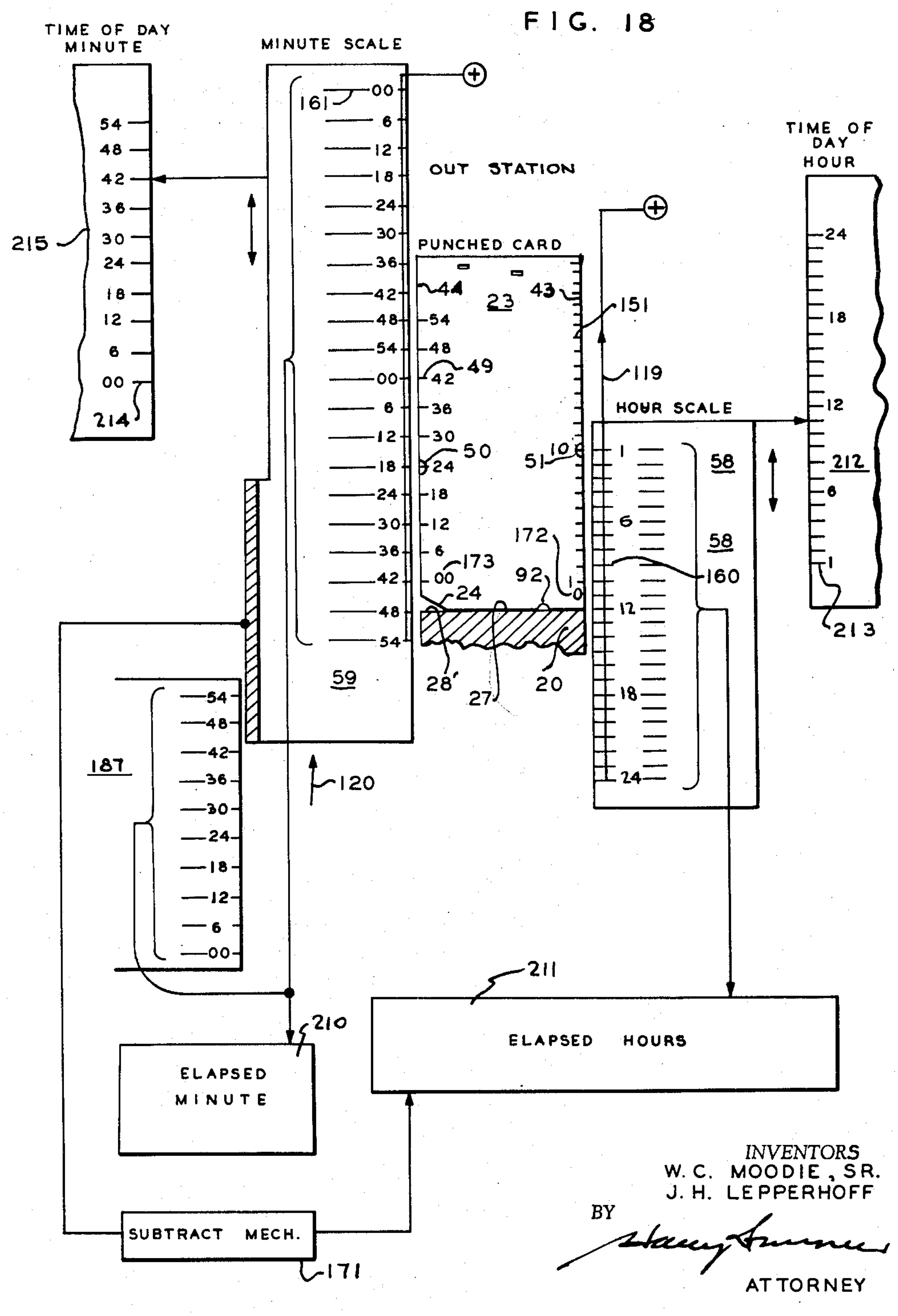
Figure 19:
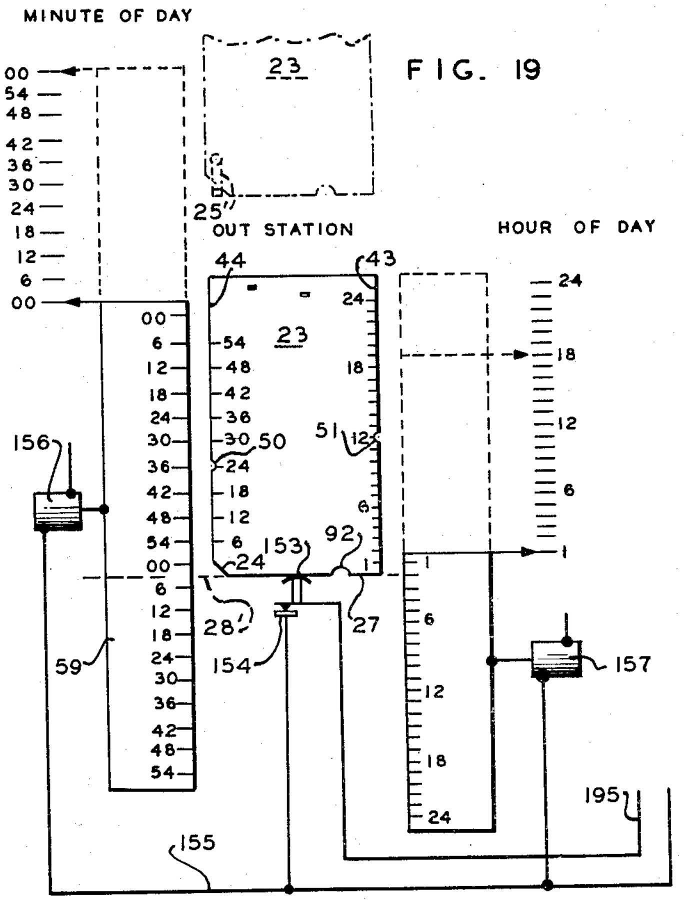
Figure 20:
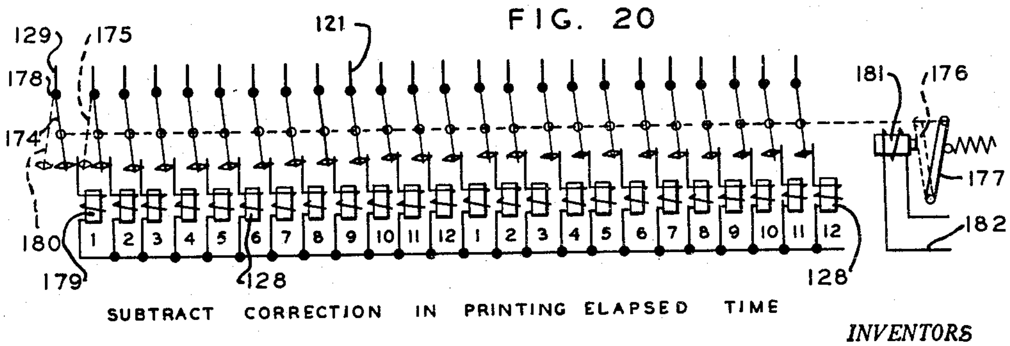
Figure 21:
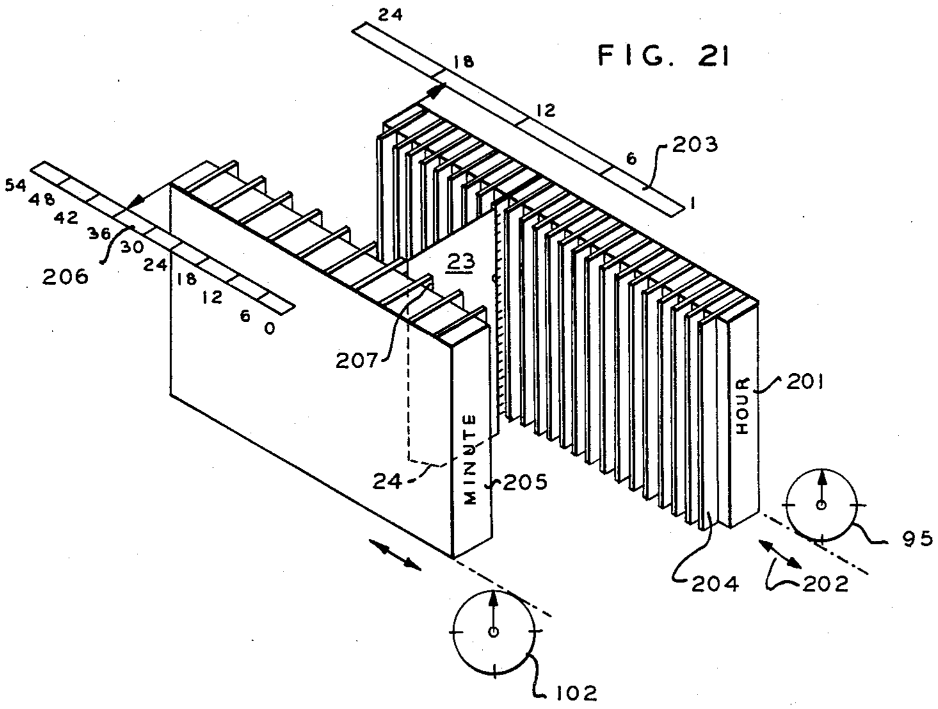
Figure 22:
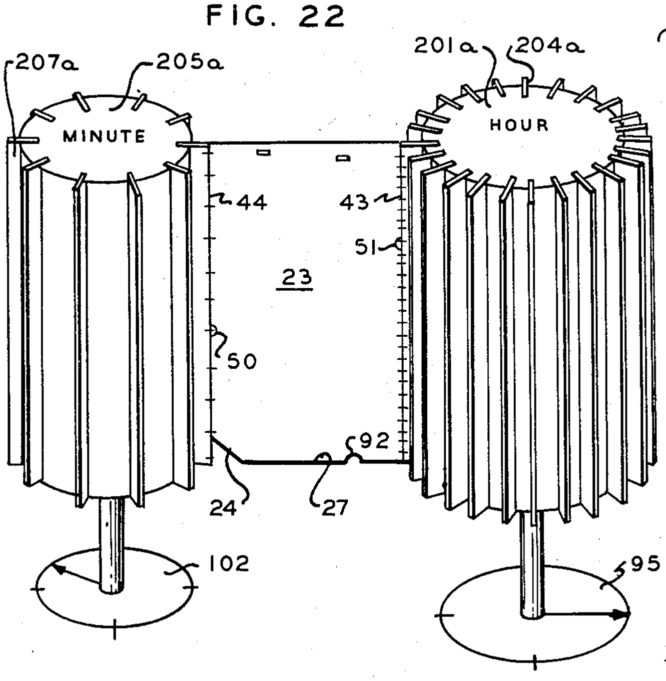
Figure 23:
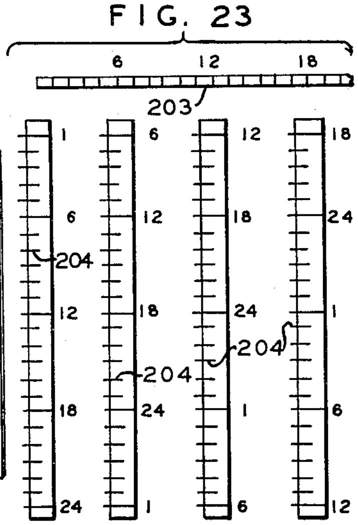
Figure 24:
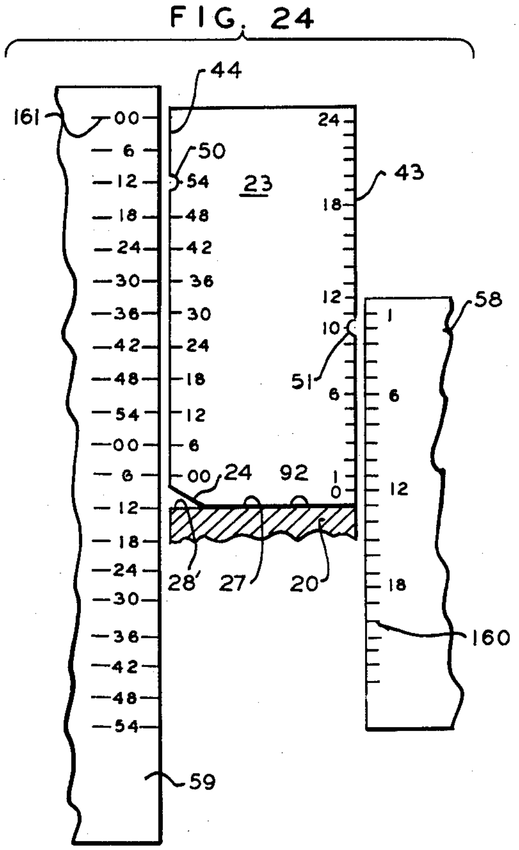
Figure 25:
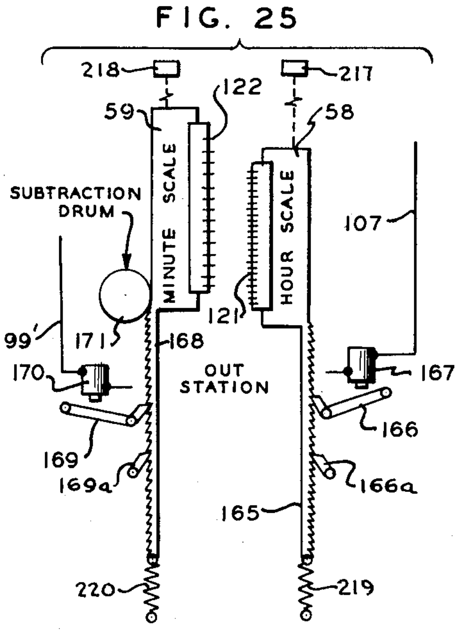

FIG. 13 is a schematic view showing the position of the press plate 146 prior to actuation thereof by solenoid 147, FIG. 14 shows the position of the press plate when so actuated to punch an elapsed time minute hole in the card, FIG. 15 is a schematic view showing the sheet constituting the circumference of subtraction drum 184 in flat planar position and showing said drum with the sheet about to be secured to the circumference thereof, FIG. 16 is a side elevational view of subtraction plate 187 shown in FIG. 17, FIG. 17 is an elevational view of said plate, showing, in dotted lines, a drive mechanism therefor, FIG. 18 is a schematic elevational view of the "out" station of the device, with the card positioned therein, and showing the sliding minute and hour scales 59, 58, dials of actual time of day, minute and hour clocks 212, 215 being also shown in straight line form to facilitate the explanation, FIG. 19 is a similar schematic view, FIG. 20 is a schematic view of the series of electromagnetic coils 128 for marking the elapsed hours and switches 174 for correcting the calculation to show true elapsed full hours as required, FIGS. 21 and 22 are perspective views of other forms of hour and minute scales which may be used in carrying out the invention, FIG. 23 is an elevational view of hour scale boards 204 which may be used with the forms of hour and minute scales shown in FIGS. 21 and 22, FIG. 24 is a fragmentary elevational schematic view of the "out" station of the device, FIG. 25 is a reduced similar view thereof, showing a time drive means which may be used with the hour and minute scales.

Figure 26:
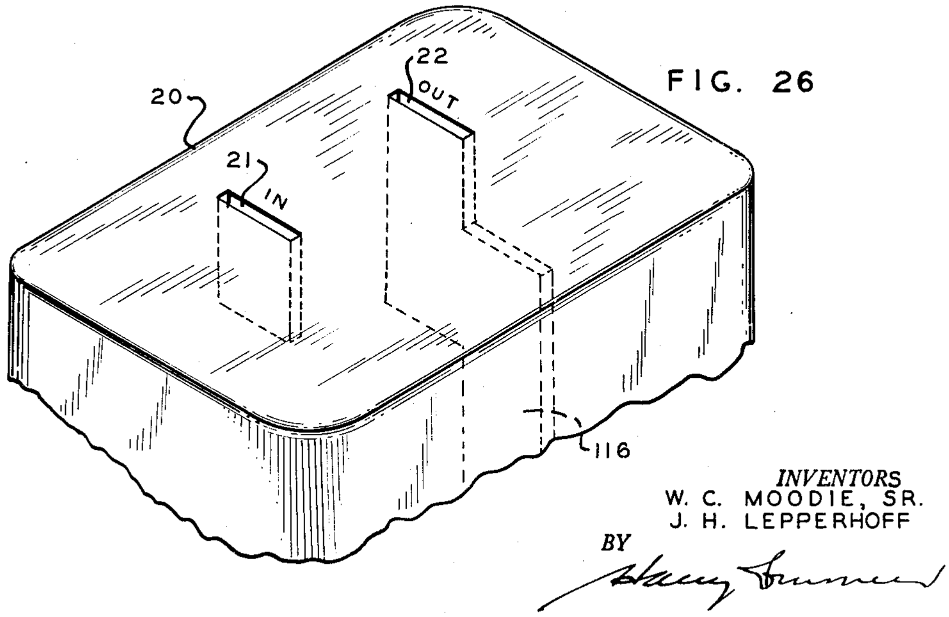

FIG. 26 is a fragmentary perspective view of a casing which may house the invention.

The invention may be incorporated in one or more casings; for clarity of reference and by way of example only, the invention is shown in FIG. 26 as incorporated in a casing 20 having vertical "in" station slot 21 into which the user deposits the card at the initiation of his working period and a vertical "out" slot 22 into which he deposits the card 23 at the conclusion of his working period. The card 23 is preferably provided with an angularly formed corner 24 (FIGS. 1–5) which cooperates with control means (such as 25, FIG. 2; 29, FIG. 5) to prevent insertion of the card to the registration edge 28 which may be a ledge at the lower end of slot 21 of the casing if the card is improperly oriented. Thus the user has a ready visual orientation reference point to make certain that he is inserting the card correctly, namely, in the position shown in FIG. 1, instead of obversely, for example, as in FIG. 2 or in some other incorrect position. Gate 25 is pivoted in casing 20 as at 26 (FIGS. 2 and 3). If the card is incorrectly inserted into the device (FIG. 2) the lower edge 27 of the card engages the control means 25 which prevents the card from being positioned against the registration ledge 28. If the card is correctly inserted (FIG. 3) the corner 24 will cause gate 25 to swing aside, allowing insertion of the card onto registration edge 28. Any other means may be provided for cooperating with the corner 24 of the card to prevent incorrect insertion of the card—for example (FIG. 5) a pin 29 may be spaced above ledge 28, to engage the lower end 27 of the card when the card is improperly inserted (FIG. 5). Said pin is received within the angular corner 24 of the card, enabling the card to be fully positioned against the registration edge 28, when the card is correctly inserted (FIG. 5).

Pressure or optically actuated switches 30, 31 (FIG. 1) are provided in an arrangement such that both switches are closed on correct insertion of the card 23 on registion ledge 28, thereby closing the circuit between the source of current 32 (FIGS. 4, 5) through connecting wire 33 and the wire connection 34 leading therefrom to electromechanical devices such as solenoids 35, 36, 37, 38. Thus (FIG. 5) if either switch is open the circuit will be broken. Swith 30 will remain closed until the card is removed from the "in" station position. Solenoids 35, 37 (FIG. 1) when thus actuated, moved press plates 39 and 40 journalled in bearings 41 guiding said press plates, toward and away from the card edges (arrow 45, FIG. 7). The press plates are thus disposed adjacent and spaced from each of the side edges 43, 44 of card 23.

Marking means such as two rows of punches 46, 47 (FIGS. 1 and 7) are disposed in the device to punch the time of positioning of the card in the "in" station (hourly notch 51—FIGS. 19 and 24 and minute notch 50). The (minute) punches 46 (FIG. 1) may mark any desired predetermined fractional part of the hour; in the illustration of FIG. 1, a decimal division of the hour into tenths (six minute units) is shown as that is convenient for bookkeeping purposes while the punches 47 are shown spaced apart at hourly intervals. The punches 46 could be of any other desired number to correspondingly mark any other desired division of an hour impressed on the side edge 44 of the card, pursuant to the invention.

As above mentioned, solenoids 35, 37 actuate the press plates 39, 40, moving the latter toward the punches 47, 46 on correct insertion of the card in registration with edge 28 as above mentioned, at the "in" station, punching side edge 44 of the card with the minute punch 50 of insertion of the card (FIGS. 1, 18, 19, 24) and punching side edge 43 of the card with the hour punch 51 by means such as by coupling press plates 39, 40 to solenoids 35, 37 by linkages 52, 53 (FIG. 1). The press plates 39, 40, when actuated by the solenoids 35, 37 (above described) will be moved toward the punches, actuating the particular punches with which interposer balls 64, 65 are in registry, on registry of card 23 with edge 28. The balls 64, 65 are fixed to chains 60, 61 entrained over pulleys 62, 63 and said chains are driven by suitable clock mechanisms 66, 67 (FIG. 1) actuated by electrical, radio or other impulses, the balls being suitably spaced to that end. Thus, in the FIG. 1 example, the position of interposer balls 64, 65 is at the twelve hour marking point of the hour side edge 43 of card 23 and at the 24 minute marking of the minute edge 44. Press plates 39, 40 are moved on energizing of solenoids 35, 37 and the punches so registered with balls 64, 65 will impress notches 51, 50 (FIG. 18) in card 23—marking the card with the "in" time.

In the example shown in FIG. 18, the minute and hour punchings 50, 51 are at the "10," "24" positions of the side edges of the card, indicating that the card was inserted in the "in" station (FIG. 1) at that time; in FIG.

19 the punchings 51, 50 on card 23 indicate that the card was inserted at 12:24 at the "in" station. The punches 46, 47 (FIG. 1) may be held in position by any suitable spring or other means in an arrangement such as shown, for example, at 54, 55 (FIG. 12) in connection with the elapsed time punches 117, 118 for impressing elapsed time marking punchings 56, 57 (FIG. 12) in the card 23 when the latter is inserted in correct orientation at the "out" station of the calculator 20 through (FIG. 26) slot 22.

The punchings 50, 51 are provided at the initial insertion of the card at the "in" station, along the side edge of the card mark the "in" time for subsequent sensing by switches carried by the sliding hour and minute scales 58, 59 (FIGS. 18, 19) marking the time of completion of the work or other period to be measured at the "out" station.

The elapsed time marking 56, 57 (FIG. 12) thus impressed on the card at the "out" station 22 may be subsequently sensed by mechanisms for example, to automatically compute the wages due the worker from the elapsed time markings 56, 57 and without requiring any person to do such computing—thus a wholly automatic calculating procedure may be attained pursuant to the invention.

The card may be further provided with a set of time of day markings to reflect at all times, the true time of day of insertion of the card at the "in" station, without any deducton of time for lunch or other work stoppage periods, such as is provided by means such as cam 114 (FIG. 6) as to the "in" and "out" marking mechanisms (64, 65, FIG. 1, 117, 118, FIG. 12). The true time of day markings (72, 73, FIG. 7) provide a check of accuracy if desired and may be used for further accounting purposes though not necesary to use of the invention for calculating elapsed time. The true time of day (72, 73, FIG. 7) may be impressed on card 23 by suitable time controlled means such as press plate 74 located parallel to and close spaced from the sets of hour and minute punches 81 (FIG. 8) and 82 (FIG. 7) which are arranged in two parallel rows and are disposed in position subject to movement, as shown for example, in FIG. 12 for the elapsed time punches 117, 118.

The time of day solenoid 36 (FIGS. 7 and 6) actuates the press plate 74 for true time of day punches 81, 82. The switches 30, 31 (FIG. 4) actuate the solenoid 36 (FIG. 7) for press plate 74 on correct insertion of card 23 at the "in" station, press plate 74 being of sufficient width to overlie the true time of day punches 81, 82. Chains 76, 77 (FIGS. 7, 6) passing beneath said press plate and have affixed thereto interposer balls 83, 84 moved by a suitable clock mechanism 80 (FIG. 7 or 93, FIG. 6) to actuate the thus selected punches 81, 82 to impress the card with the true hour and minute punchings 72, 73 at the true time of day of positioning of the card in the machine. The press plate 74 is (FIG. 7) linked to solenoid 36 by a suitable linkage such as 75 the operation corresponding generally with that described above in connection with press plates 40, 39, for the side edges of the card.

The operaton of thus punching the true time (72, 73, FIG. 7) of positioning the card in the "in" slot 21 of the device 20 and simultaneously time of initiation (50, 51, FIGS. 18, 19) of the time cycle is instantaneous and automatic on correct insertion of card 23, actuating (through switches 30, 31, FIG. 4) solenoids 35, 36, 37 (FIG. 1) for the press plates 39, 74, 40 as above mentioned and simultaneously also actuating (FIG. 4) solenoid 38 for (FIG. 1) control punch 91 which moves against the card as indicated by the dotted line in FIG. 1 and punches the control punching 92 therein (FIG. 5) whereupon the switch 31 enters punching 92, opening the circuit for the solenoids 35—38 which thus become inoperative and restoring the parts to their normal (FIG. 1) position.

The sprockets for chains 61, 60 for punching the hour and minute punchings at the side edges 43, 44 of card 23 and chains 76, 77 (FIG. 7) for punching the true hour and minute time of day of insertion of the card—all at the "in" station of the machine—may be actuated from a single clock, in an arrangement as shown in FIG. 6 wherein master clock 93 is shown actuated by electric or radio impulses, rotating shaft 94 which is keyed thereto, the plate 95 having the single tooth 96 projecting beyond the circumference thereof. Shaft 94 may thus be rotated once per hour, in which case the tooth 96 would once an hour close an electric contact 97 against contact 98 of the hour circuit wires 99, 99′ to actuate the hour ratchet solenoids 100, 100′, thus actuating the hour pawls 101, 101′ engaging the ratchets 78, 62 driving the hour chains 76, 61. Similarily, the plate 102 fixed to the shaft 94, is provided with fractional hour teeth 103 corresponding in number with the number of fractional hour punches 46 (FIG. 1) and 82 (FIG. 7). Plate 102 thus rotated will (through its teeth 103) (FIG. 6) close electric contact 104 on contact 105 to close the circuits 106, 107 for the (hourly fraction) solenoids 108, 109 correspondingly actuating the hourly fraction pawls 110, 111, driving the sprockets 79 (FIG. 7), 63 (FIG. 1) for chains 77, 60 which will thus advance to position the fraction of the hour balls 84, 65 beneath the presser plates 74, 40.

The clock shaft 94 (FIG. 6) also has keyed thereto the program drum pinion 112 which drives the gear or disk 113 having extended beyond the circumference thereof program control tooth or cam 114 so that, upon engagement of the tooth 114 with the program control contact 115, the chains 60, 61 at the "in" station (and the "out" station driving means also wired through wires 99′, 107, FIG. 25) to switch 115 and below more particularly described, will not be driven for non-productive interruptions of the day. Tooth 114 (FIG. 6) may thus be of such length as may be desired for the scheduled interruptions and it will be apparent that, by (removably or otherwise) locating a plurality of such teeth on the program drum 113 to correspond with time-out periods, the device will correspondingly automatically render the "in" and "out" time punching portions inoperative during such time out periods.

On completion of the operations above described to punch the card, as noted in FIG. 5 with the control punching 92 at the bottom edge thereof and with a time of initiation of the time cycle to be measured punched at the side edges 43, 44 of the card (as at 51, 50, FIGS. 18, 19) and with the true clock time of day of insertion of the card at the "in" station 21 marked on the card as at 72, 73 (FIG. 7) the switch 31 is open (FIG. 5) and the card cannot be further or again marked at the "in" station.

The card may ejected from the "in" station or manually removed by the user and, at the conclusion of the time period, inserted in the "out" slot 22 (FIG. 26) which may be conveniently provided with control means 25′ (FIG. 19) to prevent the insertion of the card 23 at said "out" station in the wrong position. On correct insertion of the card at the "out" station (FIG. 24) it will register with the registration ledge 28′. Slot 22 (FIG. 26) may extend beneath the top of the casing 20 for a much greater depth than does the slot 21 or other means may be used so as to essentially remove the card 23, once deposited into the "out" slot 22, from control by the user, so that further processing of the card may occur automatically. For example, on completion of processing of the card at the "out" station 22, it may be moved out of that slot and into another 116 (FIG. 26) wherein the card may be processed by sensing means engaging the elapsed time marking 56, 57 (FIG. 12) recorded on the card at the "out" station 22 as below described.

At the "out" station 22, to calculate the elapsed time markings 56, 57, the in time markings 51, 50 of the card are first sensed (FIGS. 9 and 10) and the elapsed time markings 56, 57 (FIG. 12) then impressed on the card by suitable means, for example, by punches 117, 118 (FIGS. 12–14) which may be hour and fraction of the hour punches generally corresponding with the punches 46, 47 of FIG. 1 for the side edges of the card. Punches 117, 118 are, however, disposed in closer relation to each other; they are normally held away from the card by suitable means such as springs 54, 55 (FIG. 12) and are actuated to impress the markings 56, 57 on the card 23 when the elapsed time has been calculated in accordance with the invention.

At the "out" station of the device, hour and minute scales 58, 59 (FIGS. 19, 24, 25) are moved in the direction of the arrows 119, 120 (FIG. 18). Scales 58, 59 carry switches 121, 122 (FIGS. 10 and 9) corresponding with the hour and fractional parts of the hour divisions to be measured. Any suitable clock means may be used to thus move the minute and hour scales 58, 59 in units of elapsing time in accordance with the movement of the "in" time means 64, 65 (FIG. 1), when actuated. The switches 121, 122 (FIGS. 10, 9) are fixed to the scales 58, 59 which are disposed (FIGS. 19, 24) in the device to move parallel with and spaced from the side edges 43, 44 of the card 23 and the free ends of the switches are normally spaced from the contacts 128, 125 also carried by scales 58, 59 and are held away from said contacts by spacers 123, 124 engaging side edges 43, 44 of the card.

The particular switch 122 which is aligned with the fraction of the hour punching 50 (FIG. 9) on insertion of the card in the "out" station—that particular switch being marked **122*a* for further identification—will close on its contact 125*a* due to the movement of its spacer 124*a* into the punching 50 on side edge 44 of the card 23, thus closing the circuit for the particular (126*a*) electromagnetic of the electromagnetic series 126 wired as at 127—wire 127*a* connecting 122*a* and 126*a*** (FIG. 9).

Similarly that particular one (**121*a*) (FIG. 10) of hourly switches 121 of the hour scale 58 which registers with the hour punching 51 (FIG. 10) at the side 43 of the card 23 on insertion of the card at the "out" station will close on its particular contact 128*a* of the contact series 128 for switches 121 carried by scale 58 on entry of its particular spacer (123*a*) into the "in" hour punching 51 on card edge 43 and that one (128*a*) of the series of electromagnets 128 connected to switches 121 by wires 129 will thus (through wire 129*a***) be energized.

The switches 122 are of a number and spacing apart corresponding with the hourly fractional punches 46 (FIG. 1) for the edge 44 of the card at the "in" station 21; switches 122 may be set up in multiples of the number of punches 46—for example, in double that number, as shown in FIG. 19 to cover in point of fact two hours, the switches (FIG. 9) repetitive of the same fractions of the hour as, for example, 6 minute switches **122*b* and 122*c*, may be wired to the same solenoid 126*b***.

The markings 56, 57 on the card 23 (FIG. 12) this impressed through actuation of electromagnets 128, 126 will represent elapsed hours and fractions of the hour. Interposers 141, 142 may (FIG. 12) be arranged intermediate and spaced from the elapsed time punches 117, 118 and disposed spaced therefrom by means such as springs 54, 55 (FIGS. 12–14) which normally hold the interposers (as is 142 in FIG. 12) out of the path of the press plate 146, the operative position being shown at 141 in FIG. 12. Energizing of any of the solenoids 126, 128 (FIGS. 9 and 10) attracts the particular actuator rod for the particular interposer for the particular punch to so mark the elapsed time (56, 57, FIG. 12). The armature rods 162, 145 for the interposers 141, 142 pass through apertures in the interposers and thus are connected therewith to thus move the particular interposer thus actuated intermediate the press plate 146 and the elapsed time punches so that, on actuation of press plate 146 (FIG. 14) those particular elapsed time punches 117, 118 whose associated interposers 141, 142 are thus moved by their associated electromagnets (128, 126 FIGS. 10 and 9), intermediate the press plate 146 and the elapsed time punches, will punch through the card, impressing the elapsed time marking 56, 57 (FIG. 12) thereon. Elapsed time press plate 146 is of a length and width sufficient to overlie the rows of punches 117, 118 and is actuated by a single solenoid 147, which is connected thereto by linkage 148, on closing of switch 153 (FIGS. 19, 12) by card 23 at station 22.

Elapsed time solenoid 147 is wired to micro-switch 153 (FIG. 19), wire 195 from said switch (FIGS. 19 and 12) being connected to said solenoid through time delay switch and relay 197, 198. Hour and minute scales 58, 59, normally spaced from the position of the side edges of the card are, on correct insertion of the card in the "out" station moved toward the card edges to dispose the switch spacers 123, 124 in contact therewith (FIGS. 10 and 9) by electromagnets 156, 157 (FIG. 19 wired directly to switch 153).

The electromagnets 156, 157 which are connected as at 158, 159 with the scales 58, 59 simultaneously move (on closing switch 153 on insertion of the card at the "out" station FIG. 19) said scales against the marginal edges 43, 44 of the card 23, closing that particular one of the hour switches 121 and that particular one of minute switches 122 (**121*a*, 122*a* FIGS. 10 and 9) in registry with the punchings 50, 51** at the side edges of the card.

Scales 58, 59 may be dielectric boards or panels on which said switches are mounted in spacings such that actuation of the scale advancing means (166, 169 FIG. 25) will be in units of movement equal to that of the advancing means 62, 63 for the "in" time marking means 64, 65. The means for so advancing scales 58, 59 may (for example, FIG. 25) be a gear or other time driving means shown as comprising a rack 165 fixed to the hour scale 58 and engaged by pawl 166 actuated by solenoid 167 wired (FIG. 6) to a timing source thereby moving the scale 58 in accordance with the timed energizing impulses received from such time source such as clock 93 which also energizes solenoid 100′. Similarly, scale 59 may be actuated by any suitable means such as a rack 168 (FIG. 25) to which the scale is secured and which is actuated by pawl 169 energized by solenoid 170 which may receive its fraction of the hour time energizing impulses through the wire with which (FIG. 6) the solenoid 109 driving the chain 63 is connected. The rack 168 for scale 59 also drives a subtraction switch or mechanism 171 schematically shown in FIGS. 18 and 25 as 171 and below more particularly described and exemplified in FIGS. 11, 15–17 and which corrects (FIG. 20) the calculation of the elapsed time.

The elapsed time calculating procedure above described (FIGS. 11, 15, 16, 17) works satisfactorily where the "out" time of day in minutes as indicated by the position of the marking 161 of fraction of the hour scale 59 at the moment of movement of the minute scale 59 by the solenoid 156 (FIG. 19) on the insertion of the card 23 at the "out" station of the device is greater (FIG. 18, 42) than the aligned number of minutes (24) punch (at 50) on the card at the "in" station but correction is required if the "out" time number of minutes is less than the "in" number of minutes. Correction is attained in the last mentioned condition by subtraction of one hour from the apparent number of hours reflected by the closing of the hour switch **121*a* (FIG. 10) at the hour punching 51 on the card 23. For example, if the "in" time punched on the card 23 is 10:54 and the "out" time indicated by the position of the scales 58, 59 is 11:06, the switches 121, 122 would indicate the one hour (by switch 121) difference plus a twelve minute difference (by switches 122) as the elapsed time. To correct this, the subtract conductor area 189 is provided, the subtract mechanism switch to be engaged by the contacts 188 of minute switch wire 127 (FIGS. 11, 15–17) and thus connect wires 127 with wire 182** (FIG. 20)

of hour subtract correction solenoid 181 (FIG. 20) which, when energized (dotted lines) moves the switches 174 which in their full line normal position correctly connect each wire 121 of the hour scale 58 (FIG. 10) with its solenoid 128 (FIG. 12) to the dotted line position (FIG. 20) at which each switch 174 will connect a wire 121 with an hour switch of a value of a unit of one less than called for by the position of switch 121 for that wire 129 connected to switch 174 on scale 58 (FIG. 10). The shifting of switches 174 to their dotted line positions will occur, pursuant to the invention, only when time conditions encountered require that correction, viz: When the "out" time in minutes on the scale 59 is less than the "in" time in minutes as punched on card 23. The subtract switch 187 (FIGS. 11, 15–17, 171, FIG. 25) is wired to the subtract correction solenoid 181 as above mentioned and is actuated only when the position of contact ends 188 of the extended minute scale wires 127 engage a conducting subtract area of the subtract switch (stippled for facility of reference in FIGS. 11, 15–17) but not otherwise; the remaining areas of the subtract switches are dielectric or non-conducting.

The subtract switch mechanism (FIGS. 11, 15–17) may be in the form of a disc 187 (FIG. 11) plate 185 (FIGS. 16, 17) or drum 184 (FIG. 15). Plate 187 (FIG. 17) may (arrow **185*a*) be movable horizontally by rack and pinion means 190*a*, or vertically, as in FIG. 16 indicated by the arrow 185*b***.

The configuration (FIGS. 11, 15–17) of the conducting areas of the subtract switch members is such that said conducting area will be brought to registry with and contacted by contacts 188 of minute switch wires 127 only when the "out" time (clocks 212, 215 FIG. 18) is less than the "in" time. To that end the shaft 192 for subtract switch 184 (FIG. 15) rack **192*a* for plate 187 (FIG. 17) and the shaft (not shown) at the center of disc 187 (FIG. 11) are driven by a clock mechanism such as schematically shown at 190 (FIG. 11) and which may drive pinion 190*a* (FIG. 17) in the plate form of subtract switch and (FIG. 15) shaft 192 in the drum form. By this arrangement, the contact 188 for a particular minute switch 122 will engage a conducting area of the subtract switch plate or drum only when the number of that switch is less than the "in" time number of minutes for at such time the contact 188 for that switch will engage conducting area 189 of the subtract switch (FIG. 11 for example) and close the circuit through the subtract electromagnet 181 (FIG. 20). Subtract plate 187 of FIG. 16 operates in the same fashion as in FIG. 17 but moves vertically as indicated by the arrow 185*b* by a drive mechanism which may be similar to that shown at 190*a*, 192**a (FIG. 17) as may be seen on viewing FIG. 17 at right angles to its position in the drawing.

A time delay mechanism (FIG. 12) is provided so that, on insertion of the card 23 at the "out" station of the machine and in registration with the ledge 28′ thereof (FIG. 19) closing the circuit through the wire 155 to solenoids 157, 156, moving the hour and minute scales 58, 59 switches toward the side edges of the card 23, a delay (FIG. 12) will occur in energizing the elapsed time marking solenoid 147 for press plate 146 sufficient to allow the subtract electromagnet 181 (FIG. 20) to be energized if time conditions as determined by the subtract mechanism (as above described, FIGS. 11, 15–17) so require. For example, as shown in FIG. 12 such delay may be achieved by delaying actuation of the solenoid 147 slightly beyond the time required for switch scales 58, 59 to be moved against the side edges of the card 23 and for the elapsed time subtract switch mechanism and solenoids 126, 128 to become operative. To that end (FIG. 19) on insertion of the card at the "out" station and closing the switch 153 current will flow from source 195 passing as at **195*a* through the switch 196 normally closed on wire 195*a* through the switch 153 (FIG. 19) and to solenoids 157, 156. At the same time (FIG. 12) the current passes through wire 195*b* to the time delay relay 197 and switch 198 to solenoid 147 for actuating the elapsed time press plate 146. Thus the elapsed time markings 56, 57 (FIG. 12) will not be impressed on the card until passage of a delay in time sufficient to effect a correction where required, as by the means shown in FIGS. 20, 11, 15–17 and above described. The actuation of solenoid 147 moves the switch 196 out of contact with wire 195*a* and into contact with wire 216 of a card mover such as electric vibrator 199 or the like to thus move the card 23 for example (FIG. 26) from the "out" slot 22 to a further processing slot 116 which may deliver the card to accounting personnel or lead to a mechanism which will sense and read the (FIG. 12) elapsed time markings 56, 57 and automatically make calculations based thereon. The hour and minute scales 58, 59 have been above described and shown in FIGS. 9, 10 and 25 as comprising flat plates carrying the time switches, spacers and contacts in the planar surface of card 23 and movable generally parallel with and along the edges 43, 44 of the card 23 to be sensed by said switches. Said hour and minute scales may be formed of non planar outline, as shown in FIGS. 21, 22. In FIG. 21 the "out" hour switch scale is shown formed as a frame 201 movable in a plane 202 at right angles to the longitudinal axis of the card 23, presenting to the edge of the card the frame boards or slides 204, which carry the switch, contact and spacer elements for the desired time markings, the clocks 203, 206 in FIG. 21 illustrating that form of the invention. Hour frame 201 may be driven at the "out" station by a rack and pinion or other source, energized by the clock mechanism 95 (FIGS. 21, 6). The boards 201 would be suitably divided into 24-hour periods (FIG. 23) by 24 boards spaced apart in frame 201 so as to move past edge 43 of card 23 for the units of time to be so measured—as indicated by the clock 203. Each board 204 is provided with switches wired to the hour solenoids and starting with one time unit measurement used higher than the preceding board (typified by the four boards shown in FIG. 23, which start with the 1, 6, 12, 18 hour markings. The minute scale 205 similarly formed of minute boards 207 having an arrangement of minutes and spacers and switch contacts similarly arranged for the minute scale and said boards 207 would be wired to a subtract mechanism (FIGS. 20, 11, 15–17) as described above regarding scale 59. The same description applies to the arrangement of minute and hour switches, spacers and contacts in minute and hour boards 207*a*, 204*a* (disposed in frames 205*a*, 201*a*) which are shown in FIG. 22 as circular instead of flat and rotated instead of moved horizontally relative to the axial plane of card 23. In the form shown in FIG. 22, the hour frame 201*a* is shown as a cylinder rotated in synchronism with the clock 95—15° at each hour, for example, and rotated completely once in 24 hours, and the boards 204*a* radially extended therefrom. The frame 205*a* of FIG. 22 is a cylinder driven in synchronism with the clock 102 so as to rotate said cylinder once every hour so that each of the ten boards 207*a*** will be spaced apart for a tenth of the hour or six minutes.

The term "in" station as used herein means the one at which the card is marked with the hour and fraction of hour of initiating the time cycle as shown, for example, in FIG. 1, from which station the card would be removed and inserted at the "out" station as shown in FIG. 19 for example. At the "in" and "out" stations time actuated means for marking the card move in the same direction, past a registration point (28, FIG. 1, 28′, FIG. 19) for a transverse edge of the card such as the lower edge 27 thereof. At the "in" station time actuated marking means are provided such as time division chains 60, 61 and the interposer balls 64, 65 spatially secured thereon as required by the time divisions to be used as noted by the arrangement of punches 46, 47 used, with which said balls cooperate as interposers on actuation of the press plates 39, 40 on insertion of the card, marking the card with the time of insertion. The "out" station is shown in the drawings as physically apart from the "in" station; this is for simplicity of explanation only; rather than to move the marking mechanism as in FIG. 1 to make room for the calculating mechanism in FIG. 19, the card is shown moved. Obviously, and within the scope of this invention, the card might remain and the mechanism as shown in FIG. 1 moved and other mechanism as shown in FIG. 25 moved into place. The terms "in" and "out" stations as used herein shall not be deemed limitative of the invention to any station arrangement of movement of the card. Likewise, the particular marking means shown throughout the drawings exemplify the invention, which is of the scope noted in the appended claims constituting part of this application; all other arrangements and structures, substituted for those shown in the drawings, coming within the scope of the appended claims, shall be deemed a part of this invention and within the purview thereof and covered thereby.

It will be noted that at the "in" station the time actuated marking means (which may be visualized as the interposer balls 64, 65) move in the given direction as above mentioned past the lower edge of the card and (concurrently) at the "out" station the time actuated marking means, which may be visualized as the switches carried by the scales 58, 59 will have moved past the lower edge of the card registration "out" station point 28' for a time equal to the time of insertion of the card at the "in" station plus the time which has since insertion of the card at the "in" station elapsed to the time of insertion of the card at the "out" station.

The increment units of elapsed time measured, or calculated pursuant to the invention are the unit values switches 121, 122 on the scales 58, 59, closed in the card notches 50, 51 and therefore automatically of the elapsed time or increment value.

The card 23 and associated parts at the "in" and "out" stations may be disposed in a generally vertical plane (FIGS. 1, 19, 26) for example, or in a generally horizontal plane (FIG. 7) for example, or in any other convenient or desired plane. The hour scale 58 and its drive 165 (FIG. 25) may move in a predetermined direction (such as 119, FIG. 18) in an arrangement such that, on completion of movement of the entire scale past the card position, the scale will automatically return to its zero starting point; the same arrangement may be used as to minute scale 59. To that end (FIG. 25) switches 217, 218 may be disposed at the end point of movement of the scales 58, 59 so that on contacting of said switches means will be actuated thereby to trip the pawls **166, 166*a* for rack 165 and 169, 169*a* for rack 168 so that said racks, having moved in one direction against the springs 219, 220, will return to their starting points automatically on tripping of the pawls. The return of the scales 58, 59 and associated drivers 165, 168 may be achieved mechanically by gear, solenoid or other means which would also trip the pawls and would be actuated by switches 217 and 218**, if desired.

The device of the invention as will be apparent to those familiar in this art, may have conventional and auxiliary equipment incorporated therein such as, for example, re-set switches for resetting the mechanism after power failure.

Having thus described our invention, what we claim as new and desire to secure by Letters Patent is:

1. In a calculator device, a first registration ledge on which one end of a card having opposite side edges may be positioned, to orient the card for marking purposes, a first marking member, means moving said marking member along a side edge of the card with the passage of units of one hour of time, a second marking member, means moving said second marking member along an opposite side edge of the card with the passage of units of fractions of an hour of time, means actuated on positioning the card on the registration ledge for moving said marking members against the side edges of the card to thereby mark the side edges with the hour and fraction of an hour of insertion of the card on said first registration ledge, a second registration ledge on which said end of the card may be positioned, to orient the card for sensing said markings, a first mark sensing panel, means moving said first mark sensing panel along the side edge of the card so marked with the hour of insertion on the first registration ledge, in timing with the said means moving the first marking member along a side edge of the card, a second mark sensing panel, means moving said second mark sensing panel along the said opposite side edge of the card in timing with said means moving the second marking member, means actuated on positioning the card on the second registration ledge moving said sensing panels toward the said side edges of the card, and sensing switch means carried by said panels to sense said markings, actuated on so moving said panels to mark the card with the elapsed time so calculated.

2. In a calculator device as set forth in claim 1, said sensing switch means to so mark the card with the elapsed time so calculated including means for subtraction of one hour from the calculations so made of the elapsed time when the actual minute portion of the time of so positioning said card at said second registration ledge is less than the minute timing marking at the side edge of the card.

3. In a calculator device as shown in claim 1, said means engaging said card at said first station for marking the card in accordance with the time of insertion of said card comprising punch means aligned with marginal edges of said card at said station, and actuated by said insertion of said card at said station, for impressing punchings at said marginal edges of the card in accordance with the said time of insertion of said card at said first station.

4. In a calculator device as set forth in claim 1, means at said second station actuated on insertion of said card at said second station to move into engagement with the said marginal punchings to so calculate the elapsed time.

5. In a calculating device as set forth in claim 1, said means for so marking said card at said first station comprising a plurality of punches juxtaposed in said device for registration with spaced portions of said card for so marking the card by marking the hours and fractions of an hour of insertion of said card at said first station.

6. In a calculator device as set forth in claim 1, means actuated by said time means at said first station cooperating with said punches, on correct insertion of said card at said first station, to mark the card to denote the hour and the fraction of the hour of insertion of the card at the first station.

References Cited in the file of this patent

UNITED STATES PATENTS

| | | |
|---|---|---|
| 2,591,448 | Lorenz | Apr. 1, 1952 |
| 2,868,452 | Dougherty | Jan. 13, 1959 |